Figure 1:
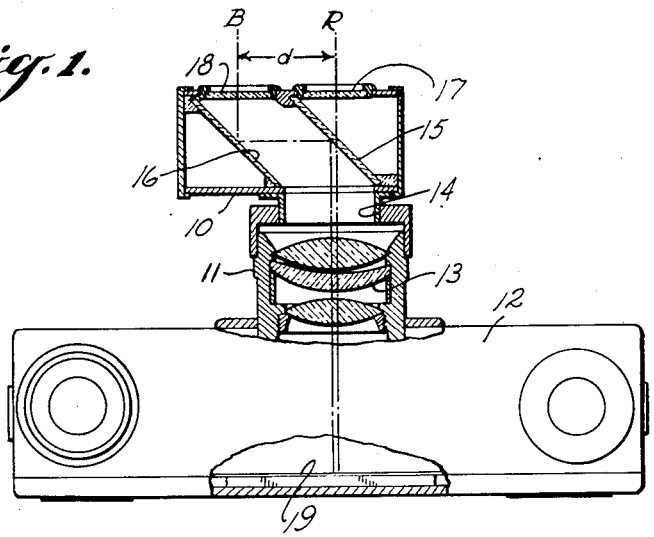

Oct. 17, 1944.    W. H. HARRISON    2,360,322
APPARATUS FOR PRODUCING STEREOSCOPIC PICTURES IN COLOR
Filed Oct. 18, 1939

INVENTOR.
William H. Harrison,
BY
ATTORNEY.

Patented Oct. 17, 1944

2,360,322

UNITED STATES PATENT OFFICE 2,360,322

APPARATUS FOR PRODUCING STEREOSCOPIC PICTURES IN COLOR

William H. Harrison, Los Angeles, Calif.

Application October 18, 1939, Serial No. 300,002

3 Claims. (Cl. 88—16.4)

My invention relates generally to apparatus for producing stereoscopic pictures, including motion pictures, and especially to apparatus for producing stereoscopic pictures in colors.

Methods of obtaining stereoscopic pictures have been known for a number of years; but these have necessitated the use of special cameras, making use of a pair of lenses, and in the case of motion picture cameras, usually two separate intermittent mechanisms, or a wider film. In addition, the pictures, as viewed by the observer, have appeared in black and white. Methods of producing motion pictures in color have been developed which are quite satisfactory, but heretofore there has been no satisfactory method of adapting colored motion pictures to stereoscopic use.

It is a major object of my invention to provide an apparatus for producing colored stereoscopic pictures which may be adapted to existing photographic equipment.

It is another object of my invention to provide such an apparatus which is mechanically and optically simple and may be used by amateurs who have not had previous photographic experience or training.

It is a further object of my invention to provide an apparatus for producing such pictures which appear as normal colored pictures when viewed without special glasses, yet when viewed with special glasses, produce an illusion of depth while retaining the sensation of color.

Figure 2:
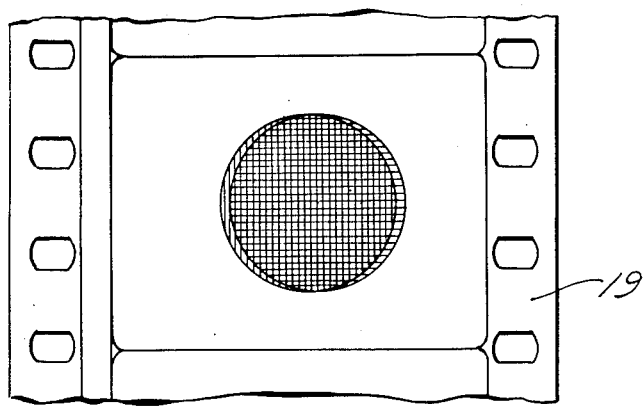

These and other objects of my invention will become apparent from the following description of a preferred form thereof, and from the drawing illustrating that form, in which:

Fig. 1 is a sectional view of one form of device which may be used in my preferred method, and Fig. 2 is a view of a section of motion picture film made in accordance with my invention.

Referring now to the drawing and particularly to Fig. 1 thereof, the numeral 10 indicates a housing adapted to be attached to the lens mount 11 of any conventional still or motion picture camera 12. Within the lens mount 11 is a lens 13, and optically aligned with the latter is an aperture 14 in the housing 10, through which light may pass. Inside of the housing 10 are two angularly-positioned mirrors 15 and 16, one of which, 15, is provided with a semi-silvered or other form of semi-reflecting surface, and is located in front of the aperture 14 at an angle of approximately 45° with the optical axis of the lens 13, so that light striking it at an angle approximately 90° from the optical axis of the lens will be reflected to the lens. The other of the two mirrors, 16, has a fully silvered, fully reflecting surface and is located in a plane substantially parallel to mirror 15 so that a light ray B, approximately parallel to the optical axis of the lens, will be displaced and enter the lens 13. Since the mirror 15 is semi-silvered, light may pass through it; and hence a light ray R, approximately parallel to the optical axis, may pass through the mirror 15 and enter the lens 13. In this way, it is possible to combine two substantially parallel beams of light, separated a distance $d$, equal to the distance between the centers of the mirrors 15 and 16, and pass those combined beams through a single lens 13.

In front of, and aligned with, each of the mirrors 15 and 16 are apertures, indicated as 17 and 18, respectively. In each of these apertures, I have provided a color filter transmitting mutually exclusive portions of the spectrum, as for example, a blue-green filter in aperture 18 in front of mirror 16, and an orange-red filter in aperture 17 in front of mirror 15. The combined rays from these two apertures 17 and 18 are focused by the lens 13 on a light-sensitive medium 19, adapted to separately record different color-value images, which medium may be a pair of films disposed face to face and known in the trade as "bi-pack," a single film such as "Kodachrome," or suitable film or films used in any of the well-known single lens color cameras. The important thing about the film is that it should be one capable of producing separate color-value images corresponding to the field included by the aperture 17 and the field included by the aperture 18, respectively; and in the claims when I speak of a plurality of superimposed color separating emulsions, I mean to include material such as "bi-pack," "Kodachrome," and similar types in which one emulsion sensitive to one color band permits other colors to pass through it to expose another emulsion behind it and sensitive to a different color band, thereby separating the colors onto different emulsions. In this way, an image is formed on the blue-green recording emulsion which corresponds to the field included by aperture 18, since only blue-green light is transmitted by the filter in that aperture, and no blue-green light is transmitted by the red filter in aperture 17. Similarly, an image is formed on the orange-red recording emulsion which corresponds to the field included by aperture 17. Thus, two separate and distinct images are formed, one in the blue-green recording emulsion and one in the orange-red recording emulsion.

If a three-color method is used, the blue from the blue-green filter will be recorded on the blue-sensitive emulsion; the red from the orange-red filter will be recorded on the red-sensitive emulsion; and the green-sensitive emulsion will record two separate images, the green from the blue-green filter and the yellow from the orange-red filter. However, if the three images are superposed, the green image from the blue-green filter will be in register with the blue image, and the yellow image from the orange-red filter will be in register with the red image.

Because of the phenomenon of parallax, the image formed through the blue-green filter will be slightly different from that formed through the red filter. It is this slight difference in the images which makes stereoscopy possible. The distance $d$ between the two mirrors or points of view may vary over comparatively wide limits, depending upon the subject matter being photographed; but for general purposes, I have found that a small distance, such as ½ inch separation when used with a camera using 16 mm. motion picture film, is quite satisfactory. Although the greater the distance $d$, the more pronounced the stereoscopic effect, the eyestrain is also increased as the distance $d$ is increased, because the eyes must then expend more energy to bring the images together and fuse them into one image. It will be apparent that the maximum permissible value of the distance $d$ will vary with different conditions; pictures taken of distant objects permitting a greater separation or $d$ than those of nearby objects.

After exposing the two or more negative emulsions, they are developed, fixed, and used to produce superposed positive images which are colored by any suitable process. I then have a positive print which may be projected and viewed in the usual manner; and when this is done, the observer sees a colored, non-stereoscopic picture in which the images have a slight color fringe, the amount of fringe depending upon the distance $d$ and the distance of the field from the lens. These colored fringes are caused by the slight difference in the fields of the two apertures 17 and 18, and as stated before, are necessary to provide a stereoscopic effect.

Assuming that the film has been exposed with a blue-green filter in the left-hand aperture 18 and an orange-red filter in the right-hand aperture 17; to produce an illusion of stereoscopy, the person observing the picture projected as described above is provided with viewing glasses which provide an orange-red filter for the left eye and a blue-green filter for the right eye. In this way, the observer sees with his left eye the field that was included by the left-hand aperture 18, and sees with his right eye the field included by the right-hand aperture 17. The image seen by the left eye is orange-red and black, with various shades in between, and that seen by the right eye is blue-green and black, with various shades in between. Each eye thus sees one color; the brain receives these two separate color images, and fuses them together to form a single stereoscopic picture in substantially natural colors.

If no color filters are used in front of the eyes, a normal two or three-color picture will be seen, although the two images will be slightly out of register. This slight amount of lack of register produces the color fringe, but because the two images are taken from points so close together, there is no resulting eyestrain and the projected picture appears as a normal colored picture. Likewise, the fact that the two images are practically in register cuts down the eyestrain incurred when viewing them stereoscopically. Thus, this method and apparatus may be used to produce colored pictures which may be viewed in the normal way, or viewed through viewing glasses to produce an illusion of stereoscopy in substantially natural colors. In this way, color pictures may be easily and cheaply produced which may either be viewed normally or with viewing glasses to produce an illusion of depth; and hence no special or additional films need be taken in order to provide films for use both where viewing glasses will be used and where they will not be used.

As an example of the actions involved, let it be assumed that it is desired to take a picture of an orange-red ball against a blue-green background. The scene as viewed through the blue-green filter in aperture 18 will consist of a black ball against a blue-green background, and when the blue-green sensitive negative is developed, it will show a white ball against a black background. As viewed through the orange-red filter in aperture 17, the scene will consist of an orange-red ball against a black background, and when the orange-red negative is developed, it will show a black ball against a clear background. If the negatives are now used to make a positive print by any of the well-known subtractive processes, the print from the blue-green sensitive negative corresponding to the field covered by aperture 18 will show an orange-red ball against a clear background, since the blue-green negative is used to make a "minus blue-green" or an orange-red print. Therefore, since that negative has been taken from a print to the left of the point at which the orange-red-sensitive negative has been taken, to secure a true stereoscopic effect in proper perspective, the print from that negative, the orange-red print, should be viewed by the left eye. Accordingly, an orange-red filter is placed in front of the left eye, and for similar reasons, a blue-green filter is placed in front of the right eye. In this way, each eye sees a field identical with that encompassed by its corresponding aperture, an illusion of depth is obtained, and since the images are so nearly identical and hence the fringe so slight, the brain coalesces the images to give a sensation of color.

Having now described and illustrated one form of my invention, I wish it to be understood that my invention is not to be limited to the specific form or manner herein described and shown, or specifically covered by my claims.

I claim as my invention:

1. A device for producing stereoscopic pictures in color which includes: a housing having a rear aperture and a front aperture; a semi-reflecting, semi-transparent surface angularly-disposed in front of said rear aperture; an angularly-disposed reflecting surface substantially parallel to said semi-reflecting surface and laterally displaced therefrom; a pair of mutually exclusive filters, one placed in the light path of said reflecting surface and the other placed in front of said semi-reflecting surface; and means for attaching said housing to the lens mount of a camera.

2. A device for producing stereoscopic pictures in color which includes: a housing having a rear aperture adapted to be aligned with the lens of a camera, and a front aperture; an angularly-disposed semi-reflecting, semi-transparent surface aligned with said rear aperture; a totally reflecting surface angularly-disposed in said housing in a plane substantially parallel to said semi-reflecting surface and relatively close thereto; a pair of mutually exclusive light filters, one placed in front of said semi-reflecting surface and the other placed in the light path of said totally reflecting surface; and means for attaching said housing to the lens mount of a camera, the whole coacting to combine light beams separated but a slight distance and pass said light beams through a single lens.

3. A device for producing stereoscopic pictures in color which includes: a housing having a rear aperture adapted to be aligned with the lens of a camera, and a front aperture; a semi-transparent, semi-reflecting surface aligned with said rear aperture; a totally reflecting surface angularly disposed in said housing in a plane substantially parallel to said semi-transparent surface and horizontally displaced a slight distance therefrom; a pair of mutually exclusive light filters, one placed in front of said semi-reflecting surface and the other placed in the light path of said totally reflecting surface, said filters and said reflecting surfaces cooperating to combine one group of color components of a scene as viewed from one point with a mutually exclusive group of color components of the same scene as viewed from a point horizontally displaced from said first point, said groups being combined so that they may pass through said camera lens as a single beam of light; and means for attaching said housing to the lens mount of a camera.

WILLIAM H. HARRISON.